Patented Jan. 1, 1924.

1,479,502

UNITED STATES PATENT OFFICE.

GUSTAV HEFFELE, OF RIVERSIDE, CALIFORNIA, ASSIGNOR OF SEVEN AND ONE-HALF PER CENT TO HERMAN J. THEROFF AND SEVEN AND ONE-HALF PER CENT TO WILLIAM LEVERS, BOTH OF LOS ANGELES, CALIFORNIA.

YEAST.

No Drawing. Application filed February 5, 1923. Serial No. 617,177.

*To all whom it may concern:*

Be it known that I, GUSTAV HEFFELE, a citizen of Russia, residing at Riverside, county of Riverside, State of California, have invented a new and useful Yeast, of which the following is a specification.

This invention relates to yeast and the process of making the same, and to the means for packing said yeast for commercial use; the yeast formed in accordance with the invention being applicable for general use to produce fermentation, and being also adapted to be eaten for the vitamines contained therein.

It is the object of the invention to produce yeast which may be kept for a relatively long time without spoiling by the growth of bacteria, but in which the yeast cells will remain alive although without active growth.

It is a further object of the invention to provide a yeast composition which is extremely palatable so that it may be eaten without further treatment.

It is a still further object of the invention to provide a packing for the yeast which will exclude air and moisture, without affecting the quality of the product in any way.

The invention consists primarily of adding onions to the yeast fermentation during formation of the yeast, it having been found by experiments that such a yeast composition will remain alive for a relatively long time and without excessive growth of harmful bacteria therein.

In carrying out the improved process, a dough is formed which preferably consists of starchy flour such as soft wheat flour, and malt and water, in the proportions of one quart of distilled water, to one and three-quarter pounds of soft wheat flour, and one-quarter pound of malt.

This dough is allowed to stand for approximately three days at a temperature of about 85°F., to allow slow, spontaneous fermentation until the dough has become slightly sour.

Onions are then boiled in water for about twenty minutes, approximately three-quarters of a pound of onions being used to one pint of distilled water, and when the mixture has cooled to about 99°F., it is added to the dough previously formed and allowed to stand for approximately three days.

Slow, spontaneous fermentation will thus continue in the dough to which the onions have been added, the onions acting as an agent to retard the activity of the growth of the yeast, and thereby form a yeast which will remain active for a long time.

About two ounces of ripe hops are then boiled in a quart of distilled water for approximately ten minutes, and about one ounce of salt and three ounces of sugar are added to the boiling mixture, which is then poured over approximately one pound of a starchy substance such as tapioca flour. When the resulting mixture has cooled to approximately 99°F., it is added to the yeast dough which is then allowed to stand for approximately twelve hours at a temperature of about 85°F., in order to complete the active growth of the yeast.

The yeast composition may be then mixed with tapioca flour until the mass contains about twenty per-cent of moisture, when the yeast is ready for use in paste form, or if desired, the moisture may be filtered from the paste so as to form dry yeast.

The yeast is preferably packed in suitable containers having a coating on their inner surfaces formed of a mixture of glycerin and wax, which will protect the yeast against moisture.

The improved yeast may be used in baking, or in the fermentation of liquids, or may be eaten without further treatment, the onions imparting a pleasing flavor to the product.

It has been found that yeast as thus described may be kept for as long as six months and at even a relatively warm temperature, without deteriorating or spoiling in any way, and if kept in a cool, dry, place will remain in good condition for a year.

I claim:

1. A yeast composition including yeast and onions.

2. A yeast composition including yeast, onions, and starch.

3. The process of forming a yeast composition which consists of cultivating yeast by spontaneous fermentation, adding onions to said yeast, and continuing the fermentation of said yeast.

4. The process of forming a yeast composition which consits of cultivating yeast by spontaneous fermentation in a dough, adding onions to said dough and continuing said fermentation, and then adding starch to said yeast dough.

5. The process of forming a yeast composition which consists of mixing a dough of malt, water, and starch and allowing said dough to stand for spontaneous fermentation; boiling onions in water and adding the mixture to said dough and allowing the latter to stand for further fermentation; and boiling hops in water with the addition of salt and sugar and mixing said liquid with a starch and adding the resulting mixture to said dough.

In testimony whereof I have signed my name to this specification.

GUSTAV HEFFELE.